United States Patent
Tang et al.

(10) Patent No.: US 10,237,089 B2
(45) Date of Patent: Mar. 19, 2019

(54) PACKET TUNNELING METHOD, SWITCHING DEVICE, AND CONTROL DEVICE

(71) Applicant: HUAWEI TECHNOLOGIES CO., LTD., Shenzhen (CN)

(72) Inventors: Pengcheng Tang, Shenzhen (CN); Wei Zhou, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 101 days.

(21) Appl. No.: 15/217,423

(22) Filed: Jul. 22, 2016

(65) Prior Publication Data

US 2016/0330045 A1 Nov. 10, 2016

Related U.S. Application Data

(63) Continuation of application No. PCT/CN2014/071229, filed on Jan. 23, 2014.

(51) Int. Cl.
*H04L 12/46* (2006.01)
*H04L 29/12* (2006.01)
(Continued)

(52) U.S. Cl.
CPC ........ *H04L 12/4633* (2013.01); *H04L 12/462* (2013.01); *H04L 45/021* (2013.01); *H04L 45/745* (2013.01); *H04L 61/6022* (2013.01)

(58) Field of Classification Search
CPC ... H04L 12/4633; H04L 45/38; H04L 45/745; H04L 49/70; H04L 45/54
See application file for complete search history.

(56) References Cited

U.S. PATENT DOCUMENTS

2011/0261723 A1* 10/2011 Yamato ................ H04L 45/34
370/255
2014/0119189 A1 5/2014 Lin
(Continued)

FOREIGN PATENT DOCUMENTS

CN 101848171 9/2010
CN 102301663 12/2011
(Continued)

OTHER PUBLICATIONS

Office Action, dated May 10, 2017, in Chinese Application No. 201480000107.4 (8 pp.).
(Continued)

*Primary Examiner* — Jung H Park
(74) *Attorney, Agent, or Firm* — Staas & Halsey LLP

(57) ABSTRACT

A packet tunneling method, a switching device, and a control device are provided. The method includes: a switching device receives a tunnel flow table entry delivered by the control device, where the tunnel flow table entry is used to determine a to-be-tunneled packet and indicate a tunneling operation to be performed on the to-be-tunneled packet; determines according to the tunnel flow table entry, whether the received first packet is the to-be-tunneled packet; and when the first packet is the to-be-tunneled packet, and tunnels the first packet according to the tunnel flow table entry. Because the switching device supports a tunnel flow table, when a packet is transmitted in a mobile packet network by using the OpenFlow protocol, tunnel encapsulation or decapsulation can be performed on the packet by using the tunnel flow table entry delivered by the control device, thereby enhancing a packet processing capability in the mobile packet network.

16 Claims, 8 Drawing Sheets

(51) Int. Cl.
*H04L 12/741* (2013.01)
*H04L 12/755* (2013.01)

(56) References Cited

U.S. PATENT DOCUMENTS

| | | | | |
|---|---|---|---|---|
| 2014/0233393 A1* | 8/2014 | Ueno | ............... | H04L 45/38 370/236 |
| 2014/0301397 A1 | 10/2014 | Zhou | | |
| 2015/0071111 A1* | 3/2015 | Tao | ............... | H04L 45/02 370/254 |
| 2016/0014241 A1* | 1/2016 | Tai | ............... | H04L 12/4633 370/474 |
| 2016/0065471 A1 | 3/2016 | Akiyoshi | | |
| 2016/0119256 A1* | 4/2016 | Wang | ............... | H04L 12/6418 370/401 |
| 2016/0157274 A1* | 6/2016 | Akiyoshi | ............... | H04W 76/02 370/254 |
| 2016/0174198 A1* | 6/2016 | Akiyoshi | ............... | H04W 24/02 370/329 |
| 2016/0205041 A1* | 7/2016 | Lee | ............... | H04L 45/38 709/226 |

FOREIGN PATENT DOCUMENTS

| | | |
|---|---|---|
| CN | 102625363 A | 8/2012 |
| CN | 102959908 A | 3/2013 |
| WO | 2013/030693 A1 | 3/2013 |
| WO | 2013/113171 A1 | 8/2013 |
| WO | 2014/000290 A1 | 1/2014 |
| WO | 2014/085207 A1 | 6/2014 |

OTHER PUBLICATIONS

Communication Pursuant to Article 94(3) EPC, dated Jun. 6, 2017, in European Application No. 14879754.1 (9 pp.).
*OpenFlow Switch Errata*, Version 1.0.2, Open Networking Foundation, Nov. 1, 2013 (12 pp.).
Nakagawa, Y. et al., *Domain Flow: Practical Flow Management Method using Multiple Flow Tables in Commodity Switches*, CoNEXT'13, Dec. 9-12, 2013, Santa Barbara, California, USA, XP55374962 pp. 399-404.
International Search Report and Written Opinion dated Oct. 31, 2014 in corresponding International Patent Application No. PCT/CN2014/071229.
Extended European Search Report dated Sep. 16, 2016 in corresponding European Patent Application No. 14879754.1.
"3rd Generation Partnership Project; Technical Specification Group Services and System Aspects; General Packet Radio Service (GPRS); Service description; Stage 2 (Release 12)", 3GPP TS 23.060 V12. 3.0, 3GPP Organizational Partners, Dec. 2013, Valbonne, France, pp. 1-344.
"OpenFlow Switch Specification Version 1.3.0 (Wire Protocol 0x04)", Open Networking Foundation, XP-002692656, Jun. 25, 2012, pp. 1-106.
International Search Report dated Oct. 31, 2014 in corresponding International Application No. PCT/CN2014/071229.
Office Action, dated Oct. 31, 2017, in Application No. 201480000107.4 (5 pp.).

* cited by examiner

PACKET TUNNELING METHOD, SWITCHING DEVICE, AND CONTROL DEVICE

CROSS-REFERENCE TO RELATED APPLICATIONS

This application is a continuation of International Application No. PCT/CN2014/071229, filed on Jan. 23, 2014, which is hereby incorporated by reference in its entirety.

TECHNICAL FIELD

The present invention relates to the field of network communications technologies, and in particular, to a packet tunneling method, a switching device, and a control device.

BACKGROUND

As the Internet scales up, a software defined network (SDN) comes into being. The SDN network uses the OpenFlow Protocol, and supports an open interface and multi-controller switching. The SDN network separates a control plane of a network device from a data forwarding plane of the network device, so that network traffic can be flexibly controlled. A function of the control plane is implemented by a controller, and the control plane is mainly responsible for delivering a traffic forwarding policy; a function of the data forwarding plane is implemented by a switch (SW for short), and the data forwarding plane is mainly used to receive a flow table entry delivered by the controller, and perform an operation on a data packet according to the flow table entry. Generally, in an SDN network, a controller is connected to each switch, and the switches are interconnected to implement data packet forwarding.

In the prior art, after receiving an initial packet of a data flow, a switching device supporting the OpenFlow protocol performs flow table matching. When no corresponding flow table entry is found after matching, the initial packet is encapsulated into an information reporting message (for example, a packet_in message), and then the information reporting message is sent to a controller. The controller determines a processing policy for the information reporting message, and then returns a flow table entry update message (for example, a flow_mod message) to the switching device. The switching device parses the flow table entry update message to obtain a flow table entry of the data flow, and processes the received initial packet according to the flow table entry.

It is found during research of the prior art that, if a packet is transmitted in a mobile packet network by using the OpenFlow protocol, a serving gateway can be used as a switching device. However, when a packet is transmitted between serving gateways, a general packet radio service (GPRS) Tunneling Protocol (GTP) tunnel needs to be established, and the packet is encapsulated in an encapsulation manner that is based on the Internet Protocol in User Data Protocol (IPinUDP). Further, because an existing flow table based on the OpenFlow protocol does not support GTP tunnel encapsulation for packets, the transmitted packet cannot be tunneled in the mobile packet network by using the OpenFlow protocol.

SUMMARY

Embodiments of the present invention provide a packet tunneling method, a switching device, and a control device, which are used to solve the problem in the prior art that a transmitted packet cannot be tunneled in a mobile packet network by using the OpenFlow protocol.

To solve the foregoing technical problem, the embodiments of the present invention disclose the following technical solutions:

According to a first aspect, a packet tunneling method is provided, where the method includes:

receiving, by a switching device, a tunnel flow table entry delivered by a control device, where the tunnel flow table entry is used to determine a to-be-tunneled packet and indicate a tunneling operation to be performed on the to-be-tunneled packet, and the control device is configured to control forwarding of a packet received by the switching device;

determining, by the switching device according to the tunnel flow table entry, whether a received first packet is the to-be-tunneled packet; and when the first packet is the to-be-tunneled packet, tunneling, by the switching device, the first packet according to the tunnel flow table entry.

With reference to the first aspect, in a first possible implementation manner of the first aspect, before the receiving, by a switching device, a tunnel flow table entry delivered by a control device, the method further includes:

reporting, by the switching device, a flow table type, which is supported by the switching device, of a flow table to the control device, where the flow table type includes a tunnel flow table; and the receiving, by a switching device, a tunnel flow table entry delivered by a control device includes: receiving, by the switching device, the tunnel flow table entry that is delivered by the control device to the switching device according to the flow table type.

With reference to the first aspect, or the first possible implementation manner of the first aspect, in a second possible implementation manner of the first aspect, before the receiving, by a switching device, a tunnel flow table entry delivered by a control device, the method further includes:

when the switching device receives a second packet of a data flow, encapsulating the second packet into an information reporting message by using the OpenFlow OpenFlow protocol, where the information reporting message further includes a match field of the second packet, and the match field is used to enable the control device to determine to tunnel the second packet, where the first packet is a packet belonging to the data flow; and reporting, by the switching device, the information reporting message to the control device; and the receiving, by a switching device, a tunnel flow table entry delivered by a control device includes: receiving, by the switching device, a flow table entry update message delivered by the control device, where the flow table entry update message is a message that is generated after the control device determines, according to the match field, to tunnel the second packet and then encapsulates, by using the OpenFlow protocol, the tunnel flow table entry generated for the second packet.

With reference to the first aspect, or the first possible implementation manner of the first aspect, or the second possible implementation manner of the first aspect, in a third possible implementation manner of the first aspect, when the tunnel flow table entry is a tunnel encapsulation flow table entry, the tunneling, by the switching device, the first packet according to the tunnel flow table entry includes:

adding, by the switching device to the first packet according to the tunnel encapsulation flow table entry, tunnel header information and a Media Access Control MAC address that is used to forward the tunnel-encapsulated first packet, where the tunnel header information includes an external Internet Protocol IP address, a User Datagram Protocol UDP port number, and a tunnel endpoint identifier TEID of the first packet.

With reference to the first aspect, or the first possible implementation manner of the first aspect, or the second possible implementation manner of the first aspect, in a fourth possible implementation manner of the first aspect, when the tunnel flow table entry is a tunnel decapsulation flow table entry, the tunneling, by the switching device, the first packet according to the tunnel flow table entry includes:

after the switching device removes tunnel header information of the first packet according to the tunnel decapsulation flow table entry, adding a MAC address that is used to forward the tunnel-decapsulated first packet, where the tunnel header information includes an external MAC address, an external IP address, a UDP port number, and a TEID of the first packet.

With reference to the first aspect, or the first possible implementation manner of the first aspect, or the second possible implementation manner of the first aspect, in a fifth possible implementation manner of the first aspect, when the tunnel flow table entry is a tunnel decapsulation flow table entry and a tunnel encapsulation flow table entry, the tunneling, by the switching device, the first packet according to the tunnel flow table entry includes:

removing, by the switching device, first tunnel header information of the first packet according to the tunnel decapsulation flow table entry, where the first tunnel header information includes a first external MAC address, a first external IP address, a first UDP port number, and a first TEID of the first packet; and adding, by the switching device to the decapsulated first packet according to the tunnel encapsulation flow table entry, second tunnel header information and a MAC address that is used to forward the tunnel-encapsulated first packet, where the second tunnel header information includes a second external IP address, a second UDP port number, and a second TEID.

According to a second aspect, a packet tunneling method is provided, where the method includes:

delivering, by a control device, a tunnel flow table entry to a switching device, where the tunnel flow table entry is used to determine a to-be-tunneled packet and indicate a tunneling operation to be performed on the to-be-tunneled packet, and the switching device is configured to determine, according to the tunnel flow table entry, whether a received first packet is the to-be-tunneled packet, and when the first packet is the to-be-tunneled packet, tunnel the first packet according to the tunnel flow table entry.

With reference to the second aspect, in a first possible implementation manner of the second aspect, before the delivering, by a control device, a tunnel flow table entry to a switching device, the method further includes:

receiving, by the control device, a flow table type, which is reported by the switching device and supported by the switching device, of a flow table, where the flow table type includes a tunnel flow table; and the delivering, by a control device, a tunnel flow table entry to a switching device includes: delivering, by the control device, the tunnel flow table entry to the switching device according to the flow table type.

With reference to the second aspect, or the first possible implementation manner of the second aspect, in a second possible implementation manner of the second aspect, before the delivering, by a control device, a tunnel flow table entry to a switching device, the method further includes:

receiving, by the control device, an information reporting message reported by the switching device, where the information reporting message is a message generated by encapsulating a second packet by using the OpenFlow protocol when the switching device receives the second packet of a data flow, the information reporting message further includes a match field of the initial packet, and the match field is used to enable the control device to determine to tunnel the second packet, where the first packet is a packet belonging to the data flow;

after the control device determines, according to the match field, to tunnel the second packet, generating the tunnel flow table entry for the second packet; and encapsulating, by the control device, the tunnel flow table entry into a flow table entry update message by using the OpenFlow protocol; and the delivering, by a control device, a tunnel flow table entry to a switching device includes: delivering, by the control device, the flow table entry update message to the switching device.

With reference to the second possible implementation manner of the second aspect, in a third possible implementation manner of the second aspect, when the tunnel flow table entry includes a tunnel encapsulation flow table entry, the flow table entry update message further includes tunnel header information, where the tunnel header information includes an external IP address, a UDP port number, and a TEID which are used to perform tunnel encapsulation on a packet; and when the tunnel flow table entry includes a tunnel decapsulation flow table entry, the flow table entry update message further includes a MAC address used to forward a tunnel-decapsulated packet.

According to a third aspect, a switching device is provided, where the switching device includes:

a receiving unit, configured to receive a tunnel flow table entry delivered by a control device, where the tunnel flow table entry is used to determine a to-be-tunneled packet and indicate a tunneling operation to be performed on the to-be-tunneled packet, and the control device is configured to control forwarding of a packet received by the switching device;

a determining unit, configured to determine, according to the tunnel flow table entry received by the receiving unit, whether a received first packet is the to-be-tunneled packet; and a processing unit, configured to: when the determining unit determines that the first packet is the to-be-tunneled packet, tunnel the first packet according to the tunnel flow table entry.

With reference to the third aspect, in a first possible implementation manner of the third aspect, the switching device further includes:

a first reporting unit, configured to: before the receiving unit receives the tunnel flow table entry, report a flow table type, which is supported by the switching device, of a flow table to the control device, where the flow table type includes a tunnel flow table; where the receiving unit is specifically configured to receive the tunnel flow table entry that is delivered by the control device to the switching device according to the flow table type.

With reference to the third aspect, or the first possible implementation manner of the third aspect, in a second possible implementation manner of the third aspect, the switching device further includes:

an encapsulating unit, configured to: when the switching device receives a second packet of a data flow, encapsulate the second packet into an information reporting message by using the OpenFlow OpenFlow protocol, where the information reporting message further includes a match field of the second packet, and the match field is used to enable the control device to determine to tunnel the second packet, where the first packet is a packet belonging to the data flow; and a second reporting unit, configured to report the information reporting message encapsulated by the encapsulating unit to the control device; where the receiving unit is specifically configured to receive a flow table entry update message delivered by the control device, where the flow table entry update message is a message that is generated after the control device determines, according to the match field, to tunnel the second packet and then encapsulates, by using the OpenFlow protocol, the tunnel flow table entry generated for the second packet.

With reference to the third aspect, or the first possible implementation manner of the third aspect, or the second possible implementation manner of the third aspect, in a third possible implementation manner of the third aspect, the processing unit is specifically configured to: when the tunnel flow table entry is a tunnel encapsulation flow table entry, add, to the first packet according to the tunnel encapsulation flow table entry, tunnel header information and a Media Access Control MAC address that is used to forward the tunnel-encapsulated first packet, where the tunnel header information includes an external Internet Protocol IP address, a User Datagram Protocol UDP port number, and a tunnel endpoint identifier TEID of the first packet.

With reference to the third aspect, or the first possible implementation manner of the third aspect, or the second possible implementation manner of the third aspect, in a fourth possible implementation manner of the third aspect, the processing unit is specifically configured to: when the tunnel flow table entry is a tunnel decapsulation flow table entry, remove tunnel header information of the first packet according to the tunnel decapsulation flow table entry, and then add a MAC address used to forward the tunnel-decapsulated first packet, where the tunnel header information includes an external MAC address, an external IP address, a UDP port number, and a TEID of the first packet.

With reference to the third aspect, or the first possible implementation manner of the third aspect, or the second possible implementation manner of the third aspect, in a fifth possible implementation manner of the third aspect, the processing unit is specifically configured to: when the tunnel flow table entry is a tunnel decapsulation flow table entry and a tunnel encapsulation flow table entry, remove first tunnel header information of the first packet according to the tunnel decapsulation flow table entry, where the first tunnel header information includes a first external MAC address, a first external IP address, a first UDP port number, and a first TEID of the first packet; and add, to the decapsulated first packet according to the tunnel encapsulation flow table entry, second tunnel header information and a MAC address that is used to forward the tunnel-encapsulated first packet, where the second tunnel header information includes a second external IP address, a second UDP port number, and a second TEID.

According to a fourth aspect, a control device is provided, where the control device includes:

a sending unit, configured to deliver a tunnel flow table entry to a switching device, where the tunnel flow table entry is used to determine a to-be-tunneled packet and indicate a tunneling operation to be performed on the to-be-tunneled packet, and the switching device is configured to determine, according to the tunnel flow table entry, whether a received first packet is the to-be-tunneled packet, and when the first packet is the to-be-tunneled packet, tunnel the first packet according to the tunnel flow table entry.

With reference to the fourth aspect, in a first possible implementation manner of the fourth aspect, the control device further includes:

a first receiving unit, configured to: before the sending unit delivers the tunnel flow table entry to the switching device, receive a flow table type, which is reported by the switching device and supported by the switching device, of a flow table, where the flow table type includes a tunnel flow table; where the sending unit is specifically configured to deliver the tunnel flow table entry to the switching device according to the flow table type received by the first receiving unit.

With reference to the fourth aspect, or the first possible implementation manner of the fourth aspect, in a second possible implementation manner of the fourth aspect, the control device further includes:

a second receiving unit, configured to: before the sending unit delivers the tunnel flow table entry to the switching device, receive an information reporting message reported by the switching device, where the information reporting message is a message generated by encapsulating a second packet by using the OpenFlow protocol when the switching device receives the second packet of a data flow, the information reporting message further includes a match field of the initial packet, and the match field is used to enable the control device to determine to tunnel the second packet, where the first packet is a packet belonging to the data flow;

a generating unit, configured to: after the control device determines, according to the match field in the information reporting message received by the second receiving unit, to tunnel the second packet, generate the tunnel flow table entry for the second packet; and an encapsulating unit, configured to encapsulate, by using the OpenFlow protocol, the tunnel flow table entry generated by the generating unit into a flow table entry update message; where the sending unit is specifically configured to deliver the flow table entry update message encapsulated by the encapsulating unit to the switching device.

With reference to the second possible implementation manner of the fourth aspect, in a third possible implementation manner of the fourth aspect, the encapsulating unit is further configured to: when the tunnel flow table entry includes a tunnel encapsulation flow table entry, add tunnel header information to the encapsulated flow table entry update message, where the tunnel header information includes an external IP address, a UDP port number, and a TEID which are used to perform tunnel encapsulation on a packet; and when the tunnel flow table entry includes a tunnel decapsulation flow table entry, add, to the encapsulated flow table entry update message, a MAC address used to forward a tunnel-decapsulated packet.

According to a fifth aspect, a switching device is provided, where the switching device includes: a network interface, a transceiver, and a processor, where the network interface is configured to establish a network connection to a control device;

the transceiver is configured to receive a tunnel flow table entry delivered by the control device, where the tunnel flow table entry is used to determine a to-be-tunneled packet and indicate a tunneling operation to be performed on the to-be-tunneled packet, and the control device is configured to control forwarding of a packet received by the switching device; and the processor is configured to determine, according to the tunnel flow table entry, whether a received first packet is the to-be-tunneled packet, and when the first packet is the to-be-tunneled packet, tunnel the first packet according to the tunnel flow table entry.

With reference to the fifth aspect, in a first possible implementation manner of the fifth aspect, the transceiver is further configured to report a flow table type, which is supported by the switching device, of a flow table to the control device, where the flow table type includes a tunnel flow table; and the transceiver is specifically configured to receive the tunnel flow table entry that is delivered by the control device to the switching device according to the flow table type.

With reference to the fifth aspect, or the first possible implementation manner of the fifth aspect, in a second possible implementation manner of the fifth aspect, the processor is further configured to: when the transceiver receives a second packet of a data flow, encapsulate the second packet into an information reporting message by using the OpenFlow OpenFlow protocol, where the information reporting message further includes a match field of the second packet, and the match field is used to enable the control device to determine to tunnel the second packet, where the first packet is a packet belonging to the data flow;

the transceiver is further configured to report the information reporting message to the control device; and the transceiver is specifically configured to receive a flow table entry update message delivered by the control device, where the flow table entry update message is a message that is generated after the control device determines, according to the match field, to tunnel the second packet and then encapsulates, by using the OpenFlow protocol, the tunnel flow table entry generated for the second packet.

With reference to the fifth aspect, or the first possible implementation manner of the fifth aspect, or the second possible implementation manner of the fifth aspect, in a third possible implementation manner of the fifth aspect, the processor is specifically configured to: when the tunnel flow table entry is a tunnel encapsulation flow table entry, add, to the first packet according to the tunnel encapsulation flow table entry, tunnel header information and a Media Access Control MAC address that is used to forward the tunnel-encapsulated first packet, where the tunnel header information includes an external Internet Protocol IP address, a User Datagram Protocol UDP port number, and a tunnel endpoint identifier TEID of the first packet.

With reference to the fifth aspect, or the first possible implementation manner of the fifth aspect, or the second possible implementation manner of the fifth aspect, in a fourth possible implementation manner of the fifth aspect, the processor is specifically configured to: when the tunnel flow table entry is a tunnel decapsulation flow table entry, remove tunnel header information of the first packet according to the tunnel decapsulation flow table entry, and then add a MAC address used to forward the tunnel-encapsulated first packet, where the tunnel header information includes an external MAC address, an external IP address, a UDP port number, and a TEID of the first packet.

With reference to the fifth aspect, or the first possible implementation manner of the fifth aspect, or the second possible implementation manner of the fifth aspect, in a fifth possible implementation manner of the fifth aspect, the processor is specifically configured to: when the tunnel flow table entry is a tunnel decapsulation flow table entry and a tunnel encapsulation flow table entry, remove first tunnel header information of the first packet according to the tunnel decapsulation flow table entry, where the first tunnel header information includes a first external MAC address, a first external IP address, a first UDP port number, and a first TEID of the first packet; and add, to the decapsulated first packet according to the tunnel encapsulation flow table entry, second tunnel header information and a MAC address that is used to forward the tunnel-encapsulated first packet, where the second tunnel header information includes a second external IP address, a second UDP port number, and a second TEID.

According to a sixth aspect, a control device is provided, where the control device includes: a network interface, a transceiver, and a processor, where the network interface is configured to establish a network connection to a switching device; and the transceiver is configured to deliver a tunnel flow table entry to the switching device, where the tunnel flow table entry is used to determine a to-be-tunneled packet and indicate a tunneling operation to be performed on the to-be-tunneled packet, and the switching device is configured to determine, according to the tunnel flow table entry, whether a received first packet is the to-be-tunneled packet, and when the first packet is the to-be-tunneled packet, tunnel the first packet according to the tunnel flow table entry.

With reference to the sixth aspect, in a first possible implementation manner of the sixth aspect, the transceiver is further configured to: before delivering the tunnel flow table entry to the switching device, receive a flow table type, which is reported by the switching device and supported by the switching device, of a flow table, where the flow table type includes a tunnel flow table; and the transceiver is specifically configured to deliver the tunnel flow table entry to the switching device according to the flow table type.

With reference to the sixth aspect, or the first possible implementation manner of the sixth aspect, in a second possible implementation manner of the sixth aspect, the transceiver is further configured to: before delivering the tunnel flow table entry to the switching device, receive an information reporting message reported by the switching device, where the information reporting message is a message generated by encapsulating a second packet by using the OpenFlow protocol when the switching device receives the second packet of a data flow, the information reporting message further includes a match field of the initial packet, and the match field is used to enable the control device to determine to tunnel the second packet, where the first packet is a packet belonging to the data flow;

the processor is further configured to: after the control device determines, according to the match field, to tunnel the second packet, generate the tunnel flow table entry for the second packet, and encapsulate the tunnel flow table entry into a flow table entry update message by using the OpenFlow protocol; and the transceiver is specifically configured to deliver the flow table entry update message to the switching device.

With reference to the second possible implementation manner of the sixth aspect, in a third possible implementation manner of the sixth aspect, the processor is further configured to: when the tunnel flow table entry includes a tunnel encapsulation flow table entry, add tunnel header information to the encapsulated flow table entry update message, where the tunnel header information includes an external IP address, a UDP port number, and a TEID which are used to perform tunnel encapsulation on a packet; and when the tunnel flow table entry includes a tunnel decapsulation flow table entry, add, to the encapsulated flow table entry update message, a MAC address used to forward a tunnel-decapsulated packet.

In the embodiments of the present invention, a control device delivers a tunnel flow table entry to a switching device; and the switching device determines, according to the tunnel flow table entry, whether a received first packet is a to-be-tunneled packet, and when the first packet is the to-be-tunneled packet, tunnels the first packet according to the tunnel flow table entry. In the embodiments of the present invention, because the switching device supports a tunnel flow table, when a packet is transmitted in a mobile packet network by using the OpenFlow protocol, tunnel encapsulation or decapsulation can be performed on the packet by using the tunnel flow table entry delivered by the control device, thereby enhancing a packet processing capability in the mobile packet network.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make a person skilled in the art understand the technical solutions in the embodiments of the present application better, and make the objectives, features, and advantages of the embodiments of the present application clearer, the following further describes the technical solutions in the embodiments of the present application in detail with reference to the accompanying drawings.

Figure 1A:
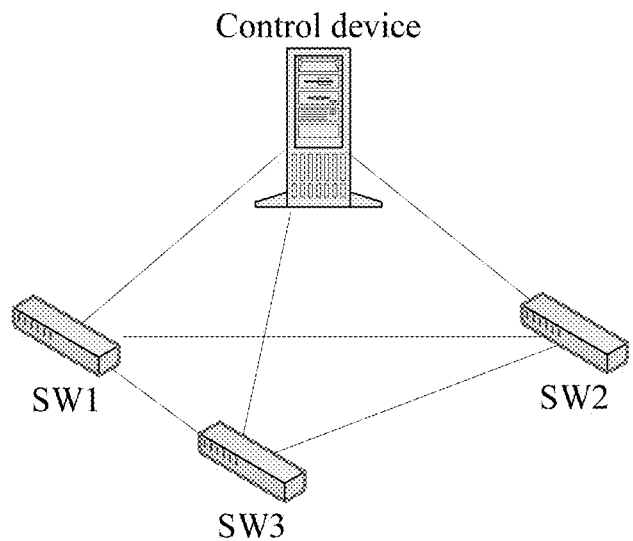
FIG. 1A is a schematic diagram of a network architecture applied in an embodiment of the present invention.

Referring to FIG. 1A, FIG. 1A is a schematic diagram of a network architecture applied in an embodiment of the present invention.

As an example, the network architecture shown in FIG. 1A is an SDN network, and the SDN network may include: one control device and three switching devices which are SW1, SW2, and SW3 respectively. The control device and the switching devices are interconnected. The control device may be a controller based on the OpenFlow protocol, a flow table is set on each switching device, and the control device may query and manage flow tables on all switching devices uniformly. Because this embodiment of the present invention is applied in a mobile packet network, SW1, SW2, and SW3 in FIG. 1A may specifically be a base station, a gateway, a public data network (PDN) device, and the like in the mobile packet network.

In the network architecture shown in FIG. 1A, the switching device may obtain a forwarding rule from the control device to transmit each data flow, and store the forwarding rule in a flow table as a flow table entry, that is, each flow table entry of a flow table stored in the switching device may identify a data flow. Generally, when the switching device transmits an initial packet of a certain data flow, because there is no flow table matching the data flow, the switching device reports the initial packet to the control device, so as to request a forwarding rule of the data flow from the control device. In the prior art, content of the foregoing flow table mainly includes a match field, counters, and an action set.

Figure 1B:
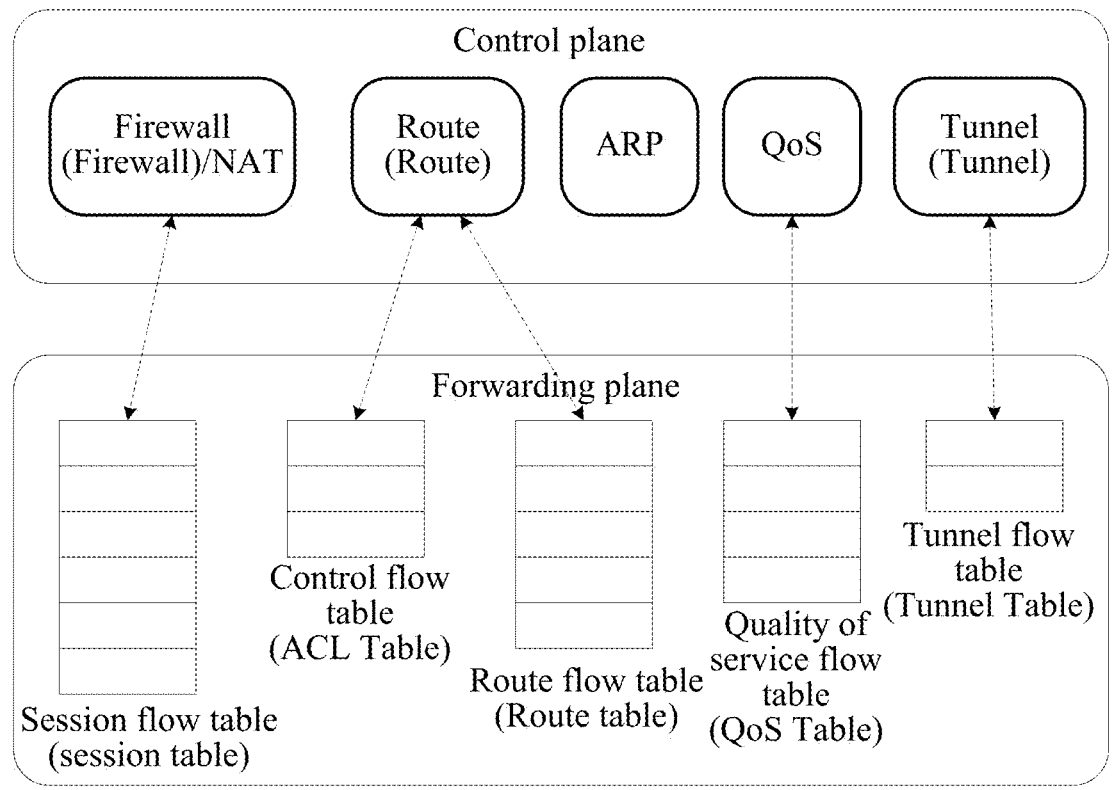
FIG. 1B is a schematic diagram showing a correspondence between control software and flow tables of different types according to an embodiment of the present invention.

In this embodiment of the present invention, the switching device manages a flow table based on a flow table type pattern (TTP), that is, flow tables in the switching device are classified according to different types. Referring to FIG. 1B, FIG. 1B is a schematic diagram showing a correspondence between control software in a control device and flow tables of different types on a switching device according to an embodiment of the present invention.

In FIG. 1B, application software running on a control plane of the control device is used to provide a policy for constructing a flow table entry, where the application software includes Firewall/NAT software implementing a firewall function, Route software and Address Resolution Protocol (ARP) software which respectively implement routing and network address translation, quality of service (QoS) software controlling quality of service, and tunnel Tunnel software implementing a tunnel encapsulation and decapsulation function. A forwarding plane of the corresponding switching device is used to store flow table entries of different types. These flow table entries are a Session Table (session flow table), an access control list (ACL) Table (control flow table), a Route Table (route flow table), a QoS Table (quality of service flow table), and a Tunnel Table (tunnel flow table) respectively. Because this embodiment of the present invention may be applied in the mobile packet network, the Tunnel software implementing a tunnel encapsulation and decapsulation generation function is added on the control plane. When performing tunnel encapsulation based on the Tunnel Table, the forwarding plane may obtain tunnel header information from another network element; when performing tunnel decapsulation based on the Tunnel Table, the forwarding plane may obtain a Media Access Control (MAC) address of a target device from another network element.

A match field for tunnel encapsulation may be a source MAC address, a destination MAC address, a source IP address, a destination IP address, a source TCP/UDP port number, a destination TCP/UDP port number, or another match field supported by the OpenFlow protocol; a supported matching manner includes exact matching and mask-based matching; and, an action or an instruction after matching is completed may be discarding a packet, jumping to a forwarding flow table, or jumping to a tunnel decapsulation flow table or another flow table in FIG. 1B. A match field for tunnel decapsulation may be a source MAC address, a destination MAC address, a source IP address, a destination IP address, a source TCP/UDP port number, a destination TCP/UDP port number, or a tunnel endpoint identifier (TEID); a supported matching manner includes exact matching and mask-based matching; and, an action or an instruction after matching is completed may be discarding a packet, jumping to a forwarding flow table, or jumping to a tunnel encapsulation flow table or another flow table in FIG. 1B.

Because the switching device and the control device in this embodiment of the present invention are devices supporting the OpenFlow protocol, during packet matching for tunnel encapsulation or tunnel decapsulation, a match field may specifically be 12 protocol fields defined in the OpenFlow1.0 Protocol, or may specifically be 40 protocol fields defined in the OpenFlow1.3 Protocol, which is not limited in this embodiment of the present invention.

Figure 2A:
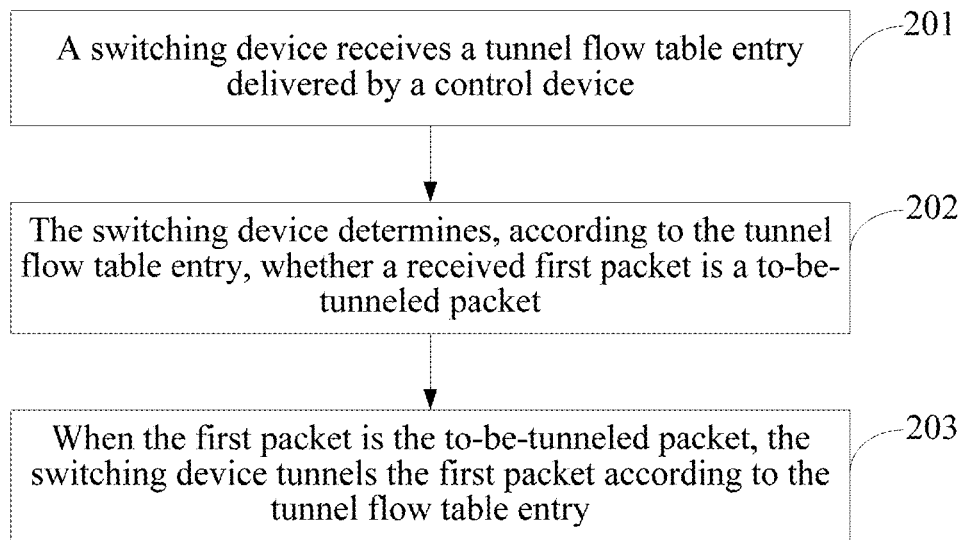
FIG. 2A is a flowchart of an embodiment of a packet tunneling method according to the present invention.

Referring to FIG. 2A, FIG. 2A is a flowchart of an embodiment of a packet tunneling method according to the present invention. This embodiment describes a packet tunneling procedure from a switching device side.

Step 201: A switching device receives a tunnel flow table entry delivered by a control device.

In this embodiment of the present invention, the tunnel flow table entry is used to determine a to-be-tunneled packet and indicate a tunneling operation to be performed on the to-be-tunneled packet, and the control device is configured to control forwarding of a packet received by the switching device.

Optionally, in this embodiment of the present invention, because the switching device can store a flow table according to a flow table type, before receiving the tunnel flow table entry delivered by the control device, the switching device may negotiate a supported flow table type with the control device, that is, before receiving the tunnel flow table entry delivered by the control device, the switching device may report the supported flow table type of a flow table to the control device, where the flow table type includes a tunnel flow table. Correspondingly, the switching device may receive a tunnel flow table entry that is delivered by the control device to the switching device according to the flow table type. Specifically, during negotiation, the control device may send, to the switching device, a request message for requesting a flow table type supported by the switching device, and the switching device may send, to the control device, a reply message carrying the supported flow table type of the flow table, so as to complete table type negotiation.

Optionally, in this embodiment of the present invention, before the switching device receives the tunnel flow table entry delivered by the control device, when receiving a second packet of a data flow, the switching device may encapsulate the second packet into an information reporting message (for example, a packet_in message) by using the OpenFlow OpenFlow protocol, where the information reporting message may include a match field of the second packet, and the match field is used to enable the control device to determine to tunnel the second packet. A first packet and the second packet belong to a same data flow, and generally, the second packet is an initial packet of the data flow. In the information reporting message, the match field may be set independently of the second packet, or may be included in the second packet, which is not limited in this embodiment of the present invention. The switching device reports the information reporting message to the control device, the control device determines, according to the match field, to tunnel the second packet, and then the switching device receives a flow table entry update message (for example, a flow_mod message) delivered by the control device, where the flow table entry update message is a message generated after the control device encapsulates, by using the OpenFlow protocol, the tunnel flow table entry generated for the second packet.

Step 202: The switching device determines, according to the tunnel flow table entry, whether a received first packet is the to-be-tunneled packet.

In this embodiment of the present invention, the tunnel flow table entry may include at least one of the following flow table entries: a tunnel encapsulation flow table entry and a tunnel decapsulation flow table entry.

Step 203: When the first packet is the to-be-tunneled packet, the switching device tunnels the first packet according to the tunnel flow table entry.

When the tunnel flow table entry is a tunnel encapsulation flow table entry, the switching device may add, to the first packet according to the tunnel encapsulation flow table entry, tunnel header information and a MAC address that is used to forward a tunnel-encapsulated first packet, where the tunnel header information may include an external IP address, a UDP port number, and a TEID of the first packet.

When the tunnel flow table entry is a tunnel decapsulation flow table entry, after removing the tunnel header information of the first packet according to the tunnel decapsulation flow table entry, the switching device may add a MAC address used to forward the tunnel-decapsulated first packet, where the tunnel header information may include an external MAC address, an external IP address, a UDP port number, and a TEID of the first packet.

When the tunnel flow table entry is a tunnel decapsulation flow table entry and a tunnel encapsulation flow table entry, the switching device may remove first tunnel header information of the first packet according to the tunnel decapsulation flow table entry, where the first tunnel header information includes a first external MAC address, a first external IP address, a first UDP port number, and a first TEID of the first packet; and the switching device adds, to the decapsulated first packet according to the tunnel encapsulation flow table entry, second tunnel header information and the MAC address that is used to forward the tunnel-encapsulated first packet, where the second tunnel header information includes a second external IP address, a second UDP port number, and a second TEID.

It can be seen from the foregoing embodiment that, in this embodiment, because a switching device supports a tunnel flow table, when a packet is transmitted in a mobile packet network by using the OpenFlow protocol, tunnel encapsulation or decapsulation can be performed on the packet by using a tunnel flow table entry delivered by a control device, thereby enhancing a packet processing capability in the mobile packet network.

Figure 2B:
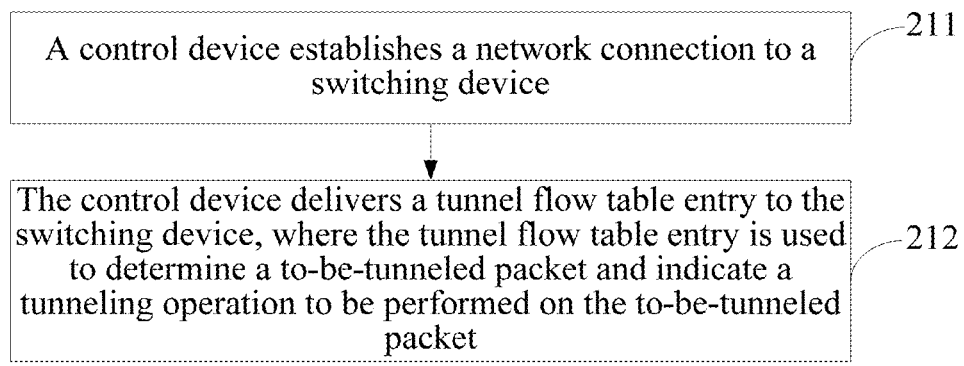
FIG. 2B is a flowchart of another embodiment of a packet tunneling method according to the present invention.

Referring to FIG. 2B, FIG. 2B is a flowchart of another embodiment of a packet tunneling method according to the present invention. This embodiment describes a packet tunneling procedure from a controller side.

Step 211: A control device establishes a network connection to a switching device.

Step 212: The control device delivers a tunnel flow table entry to the switching device, where the tunnel flow table entry is used to determine a to-be-tunneled packet and indicate a tunneling operation to be performed on the to-be-tunneled packet.

Optionally, in this embodiment of the present invention, because the switching device can store a flow table according to a flow table type, after the control device establishes a network connection to the switching device, the control device may negotiate a flow table type supported by the switching device with the switching device, that is, before delivering the tunnel flow table entry to the switching device, the control device may receive the supported flow table type, which is reported by the switching device, of a flow table. Correspondingly, the control device may deliver the tunnel flow table entry to the switching device according to the flow table type. Specifically, during negotiation, the control device may send, to the switching device, a request message for requesting a flow table type supported by the switching device, and the switching device may send, to the control device, a reply message carrying the supported flow table type of the flow table, so as to complete table type negotiation.

Optionally, in this embodiment of the present invention, before delivering the tunnel flow table entry to the switching device, the control device may receive an information reporting message (for example, a packet_in message) reported by the switching device, where the information reporting message is a message generated by encapsulating a second packet by using the OpenFlow protocol when the switching device receives the second packet of a data flow, and the information reporting message further includes a match field of the second packet. The second packet and a first packet belong to a same data flow. In the information reporting message, the match field may be set independently of the second packet, or may be included in the second packet, which is not limited in this embodiment of the present invention. After determining, according to the match field, to tunnel the second packet, the control device generates the tunnel flow table entry for the second packet, encapsulates the tunnel flow table entry into a flow table entry update message (for example, a flow_mod message) by using the OpenFlow protocol, and then delivers the flow table entry update message to the switching device.

It can be seen from the foregoing embodiment that, in this embodiment, because a switching device supports a tunnel flow table, when a packet is transmitted in a mobile packet network by using the OpenFlow protocol, tunnel encapsulation or decapsulation can be performed on the packet by using a tunnel flow table entry delivered by a control device, thereby enhancing a packet processing capability of the switching device in the mobile packet network.

Figure 3:
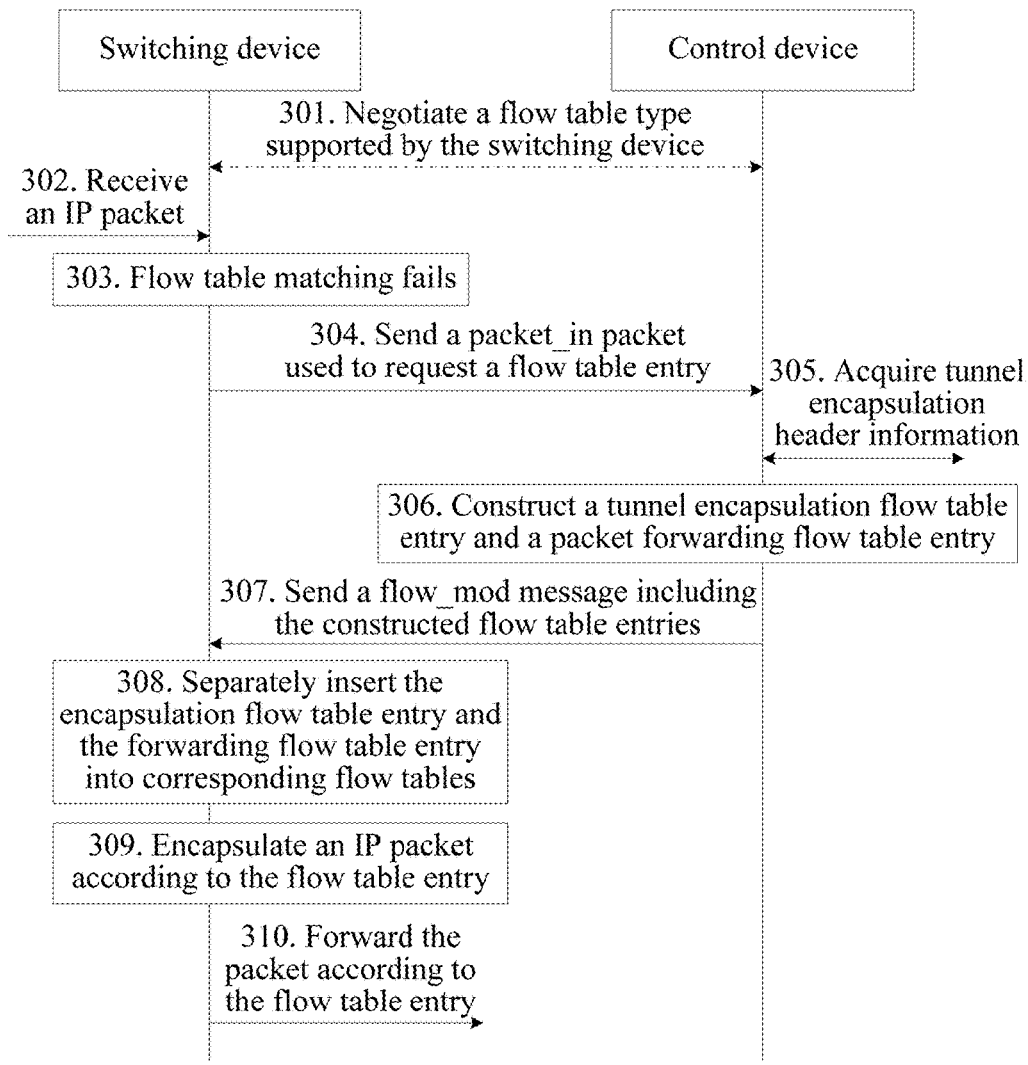
FIG. 3 is a flowchart of another embodiment of a packet tunneling method according to the present invention.

Referring to FIG. 3, FIG. 3 is a flowchart of another embodiment of a packet tunneling method according to the present invention. This embodiment shows a processing procedure in which a packet is encapsulated and forwarded.

Step 301: A switching device negotiates a flow table type supported by the control device with a control device.

In this step, the control device may send a table feature request (table entry type request) message to the switching device, to request a flow table type on the switching device; after receiving the table feature request message, the switching device may generate a table feature reply (table entry type reply) message including the flow table type supported by the switching device, and send the table feature reply message to the control device, so as to complete a procedure of negotiating a flow table type between the control device and the switching device.

Step 302: The switching device receives an IP packet.

In this embodiment, it is assumed that an Internet Protocol (IP) packet received by the switching device is an initial packet of a certain data flow.

Step 303: The switching device does not find a flow table matching the IP packet.

After receiving the IP packet, the switching device matches the IP packet with a flow table in the switching device. Because the IP packet is an initial packet of the data flow, a flow table entry matching the IP packet cannot be found in an existing flow table. As a result, the switching device fails to find a flow table for the IP packet.

Step 304: The switching device reports, to the control device, a packet_in packet obtained after the IP packet is encapsulated.

The switching device encapsulates the IP packet into the packet_in packet by using the OpenFlow protocol, where the packet_in packet may include a match field used as a feature of the packet, in addition to the original IP packet. The switching device reports the packet_in packet to a controller.

The match field may be a field of the flow table searched for by a user in the foregoing step 303; and the match field may refer to at least one field in 12 fields defined in the OpenFlow1.0 protocol, or may refer to at least one field in 40 fields in the OpenFlow1.3 protocol.

Step 305: The control device determines to perform tunnel encapsulation on the IP packet, and acquires header information for tunnel encapsulation.

In this embodiment, a correspondence between a match field and an execution action may be preset in the control device. After receiving the packet_in packet, the control device parses the packet to obtain a match field included in the packet, and matches the match field with the foregoing correspondence, to obtain an execution action corresponding to the match field. The match field may specifically be a source IP address, a source MAC address, or the like of the packet. For example, the match field stored in the correspondence is "a source IP address 1.1.1.1", and a corresponding execution action is "encapsulating"; then, if a source IP address obtained after the control device parses the IP packet is "1.1.1.1", the control device determines to perform tunnel encapsulation on the IP packet.

In this step, the control device may specifically refer to an SDN controller and a core network controller that are in a mobile network, for example, a mobile management entity (MME), a serving gateway (SGW), or a PDN gateway (PGW). When determining to perform tunnel encapsulation on the IP packet, the control device may obtain header information for tunnel encapsulation from the core network controller, where the header information includes an external IP address, a User Datagram Protocol (UDP) port number, and a TEID that are used for tunnel encapsulation.

Step 306: The control device constructs an encapsulation flow table entry and a forwarding flow table entry for the IP packet.

When constructing the encapsulation flow table entry and the forwarding flow table entry for the IP packet, the control device may use construction manners described in the existing OpenFlow1.0 protocol and OpenFlow1.3 protocol. The constructed flow table entries mainly include a match field, counters, and an action set (Instructions), and may further include a priority of the flow table entry in a corresponding flow table. A match field in the match domain of the encapsulation flow table entry may be a source MAC address, a destination MAC address, a source IP address, a destination IP address, a source TCP/UDP port number, or a destination TCP/UDP port number; after matching is completed, an action instruction in the action set may be discarding a packet, jumping to a forwarding flow table, or jumping to a tunnel decapsulation flow table. The forwarding flow table entry may be a flow table entry in the Route Table shown in the foregoing FIG. 1B.

Step 307: The control device encapsulates the constructed flow table entries into a flow_mod message and then sends the flow_mod message to the switching device.

The control device encapsulates the encapsulation flow table entry and the forwarding flow table entry into the flow_mod message by using the OpenFlow protocol, where the flow_mod message includes a flow table type, a flow table entry corresponding to each flow table type, and header information for tunnel encapsulation.

Step 308: The switching device respectively inserts the encapsulation flow table entry and the forwarding flow table entry that are in the flow_mod message into a corresponding encapsulation flow table and forwarding flow table according to types.

After receiving the flow_mod message, the switching device parses the flow_mod message, to obtain the encapsulation flow table entry and the forwarding flow table entry that are in the flow_mod message, and may insert the encapsulation flow table entry into a corresponding location of the encapsulation flow table according to a priority of the encapsulation flow table entry, and insert the forwarding flow table entry into a corresponding location of the forwarding flow table according to a priority of the forwarding flow table entry.

Step 309: After matching the IP packet with the encapsulation flow table, the switching device performs tunnel encapsulation on the IP packet.

In the foregoing step 303, when the switching device does not find the flow table entry matching the IP packet, the switching device may first store the IP packet in a buffer. In this step, the switching device may extract the IP packet from the buffer, match the IP packet with the flow table, and perform tunnel encapsulation on the IP packet according to a matched flow table entry. During tunnel encapsulation, the switching device adds tunnel header information and an external MAC address to the IP packet, where the tunnel header information includes an external IP address, a UDP port number, and a TEID, and the external MAC address may be obtained from an ARP flow table or the forwarding flow table.

Step 310: The switching device matches the tunnel-encapsulated packet with the forwarding flow table, and forwards the tunnel-encapsulated packet according to the forwarding flow table entry.

After encapsulating the IP packet, the switching device further performs matching of the forwarding flow table, to obtain a corresponding forwarding flow table entry, and forwards the tunnel-encapsulated packet according to the forwarding flow table entry. Compared with the prior art, during matching of the forwarding flow table entry, a TEID may further be added as the match field in this embodiment.

It can be seen from the foregoing embodiment that, in this embodiment, because a switching device supports a tunnel flow table, when a packet is transmitted in a mobile packet network by using the OpenFlow protocol, tunnel encapsulation or decapsulation can be performed on the packet by using a tunnel flow table entry delivered by a control device, thereby enhancing a packet processing capability in the mobile packet network.

Figure 4:
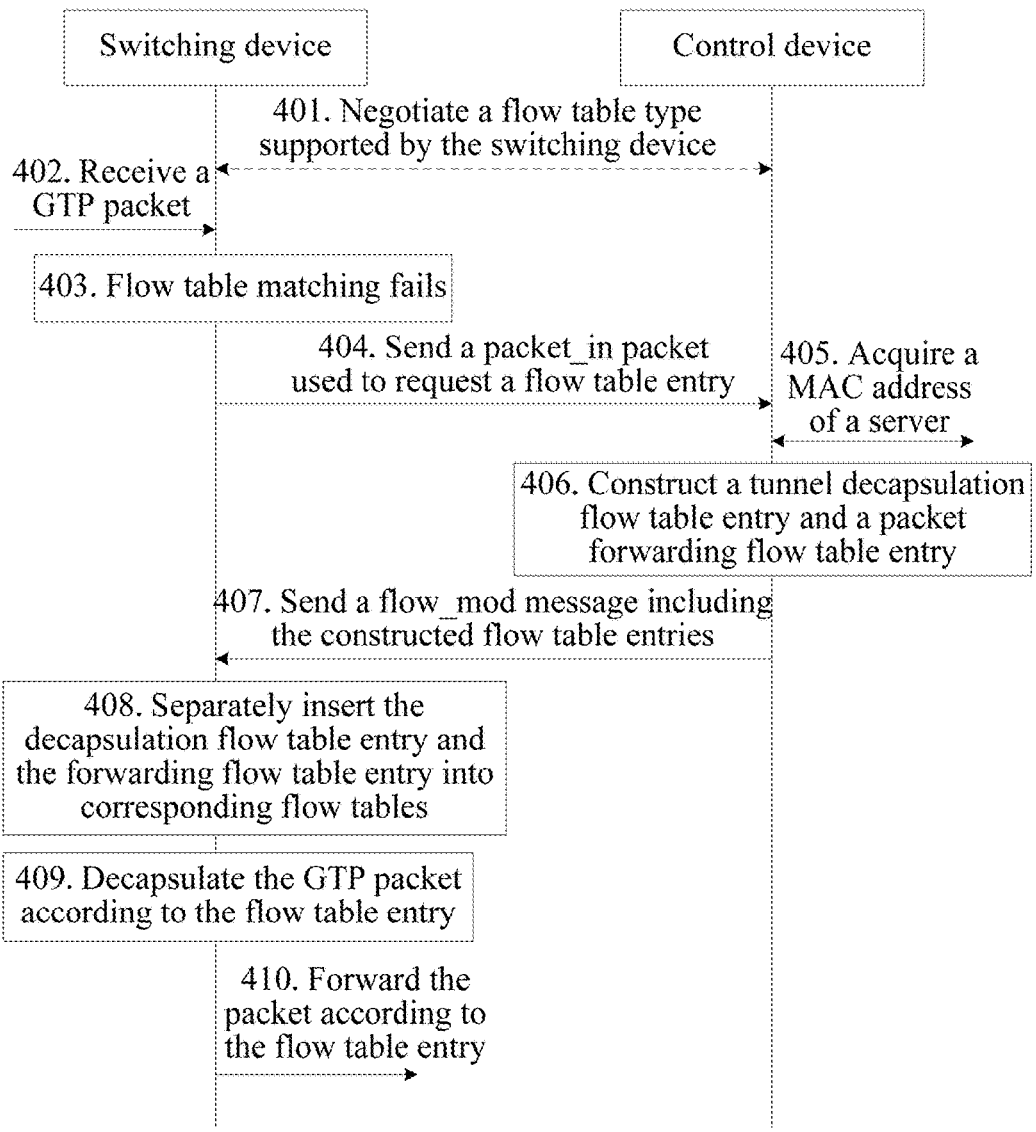
FIG. 4 is a flowchart of another embodiment of a packet tunneling method according to the present invention.

Referring to FIG. 4, FIG. 4 is a flowchart of another embodiment of a packet tunneling method according to the present invention. This embodiment shows a processing procedure in which a packet is decapsulated and forwarded Step 401: A switching device negotiates a flow table type supported by the control device with a control device.

In this step, the control device may send a table feature request (table entry type request) message to the switching device, to request a flow table type on the switching device; after receiving the table feature request message, the switching device may generate a table feature reply (table entry type reply) message including the flow table type supported by the switching device, and send the table feature reply message to the control device, so as to complete a procedure of negotiating a flow table type between the control device and the switching device.

Step 402: The switching device receives a GTP packet.

In this embodiment, it is assumed that the GTP packet received by the switching device is an initial packet of a certain data flow.

Step 403: The switching device does not find a flow table matching the GTP packet.

After receiving the GTP packet, the switching device matches the GTP packet with a flow table in the switching device. Because the GTP packet is an initial packet of the data flow, a flow table entry matching the GTP packet cannot be found in an existing flow table. As a result, the switching device fails to find a flow table for the GTP packet.

Step 404: The switching device reports a packet_in packet obtained after the GTP packet is encapsulated to the control device.

The switching device encapsulates the GTP packet into the packet_in packet by using the OpenFlow protocol, where the packet_in packet may include a match field used as a feature of the packet, in addition to the original GTP packet. The switching device reports the packet_in packet to a controller.

The match field may be a field of the flow table searched for by a user in the foregoing step 403; and the match field may refer to at least one field in 12 fields defined in the OpenFlow1.0 protocol, or may refer to at least one field in 40 fields in the OpenFlow1.3 protocol. Further, in this embodiment, the match field may further include a TEID.

Step 405: The control device determines to perform tunnel decapsulation on the GTP packet, and acquires a MAC address used to forward a decapsulated packet.

In this embodiment, a correspondence between a match field and an execution action may be preset in the control device. After receiving the packet_in packet, the control device parses the packet to obtain a match field included in the packet, and matches the match field with the foregoing correspondence, to obtain an execution action corresponding to the match field. The match field may specifically be a source IP address, a source MAC address, or the like of the packet. For example, the match field stored in the correspondence is that "a source IP address is an address of a GGSN" and a corresponding execution action is "decapsulating"; then, if a source IP address obtained after the control device parses the IP packet is the address of the GGSN, the control device determines to perform tunnel decapsulation on the GTP packet.

After determining to perform tunnel decapsulation on the GTP packet, the control device may obtain, from an ARP module, a MAC address of a next-hop switching device, where the MAC address is used to forward the decapsulated GTP packet. The ARP module stores a correspondence between an IP address and a MAC address. In this case, a corresponding MAC address can be acquired according to an IP address existing before packet encapsulation, where the IP address existing before packet encapsulation is specifically an IP address of a router behind a core network or an IP address of an application server.

Step 406: The control device constructs a decapsulation flow table entry and a forwarding flow table entry for the GTP packet.

When constructing the decapsulation flow table entry and the forwarding flow table entry for the GTP packet, the control device may use construction manners described in the existing OpenFlow1.0 protocol and OpenFlow1.3 protocol. The constructed flow table entries mainly include a match field, counters, and an action set (Instructions), and may further include a priority of the flow table entry in a corresponding flow table. A match field in the match domain of the decapsulation flow table entry may be a source MAC address, a destination MAC address, a source IP address, a destination IP address, a source TCP/UDP port number, a destination TCP/UDP port number, or a TEID; after matching is completed, an action instruction in the action set may be discarding a packet, jumping to a forwarding flow table, or jumping to a tunnel encapsulation flow table. The forwarding flow table entry may be a flow table entry in the Route Table shown in the foregoing FIG. 1B.

Step 407: The control device encapsulates the constructed flow table entries into a flow_mod message and then sends the flow_mod message to the switching device.

The control device encapsulates the decapsulation flow table entry and the forwarding flow table entry into the flow_mod message by using the OpenFlow protocol, where the flow_mod message includes a flow table type, a flow table entry corresponding to each flow table type, and the MAC address used to forward the decapsulated packet and acquired in step 405.

Step 408: The switching device respectively inserts the decapsulation flow table entry and the forwarding flow table entry that are in the flow_mod message into a corresponding decapsulation flow table and forwarding flow table according to types.

After receiving the flow_mod message, the switching device parses the flow_mod message, to obtain the decapsulation flow table entry and the forwarding flow table entry that are in the flow_mod message, and may insert the decapsulation flow table entry into a corresponding location of the decapsulation flow table according to a priority of the decapsulation flow table entry, and insert the forwarding flow table entry into a corresponding location of the forwarding flow table according to a priority of the forwarding flow table entry.

Step 409: After matching the GTP packet with an encapsulation flow table, the switching device performs tunnel decapsulation on the GTP packet.

In the foregoing step 403, when the switching device does not find the flow table entry matching the GTP packet, the switching device may first store the GTP packet in a buffer. In this step, the switching device extracts the GTP packet from the buffer, then matches the GTP packet with a flow table, and performs tunnel decapsulation on the GTP packet according to a matched flow table entry. During tunnel decapsulation, the switching device removes an external MAC address, an IP address, a UDP port number, and a TEID of the packet, and adds the MAC address carried in the flow_mod message.

Step 410: The switching device matches the tunnel-decapsulated packet with the forwarding flow table, and forwards the tunnel-decapsulated IP packet according to the forwarding flow table entry.

After performing tunnel decapsulation on the GTP packet to obtain the IP packet, the switching device further performs matching of the forwarding flow table, to obtain a corresponding forwarding flow table entry, and forwards the tunnel-decapsulated packet according to the forwarding flow table entry.

It can be seen from the foregoing embodiment that, in this embodiment, because a switching device supports a tunnel flow table, when a packet is transmitted in a mobile packet network by using the OpenFlow protocol, tunnel encapsulation or decapsulation can be performed on the packet by using a tunnel flow table entry delivered by a control device, thereby enhancing a packet processing capability in the mobile packet network.

Figure 5:
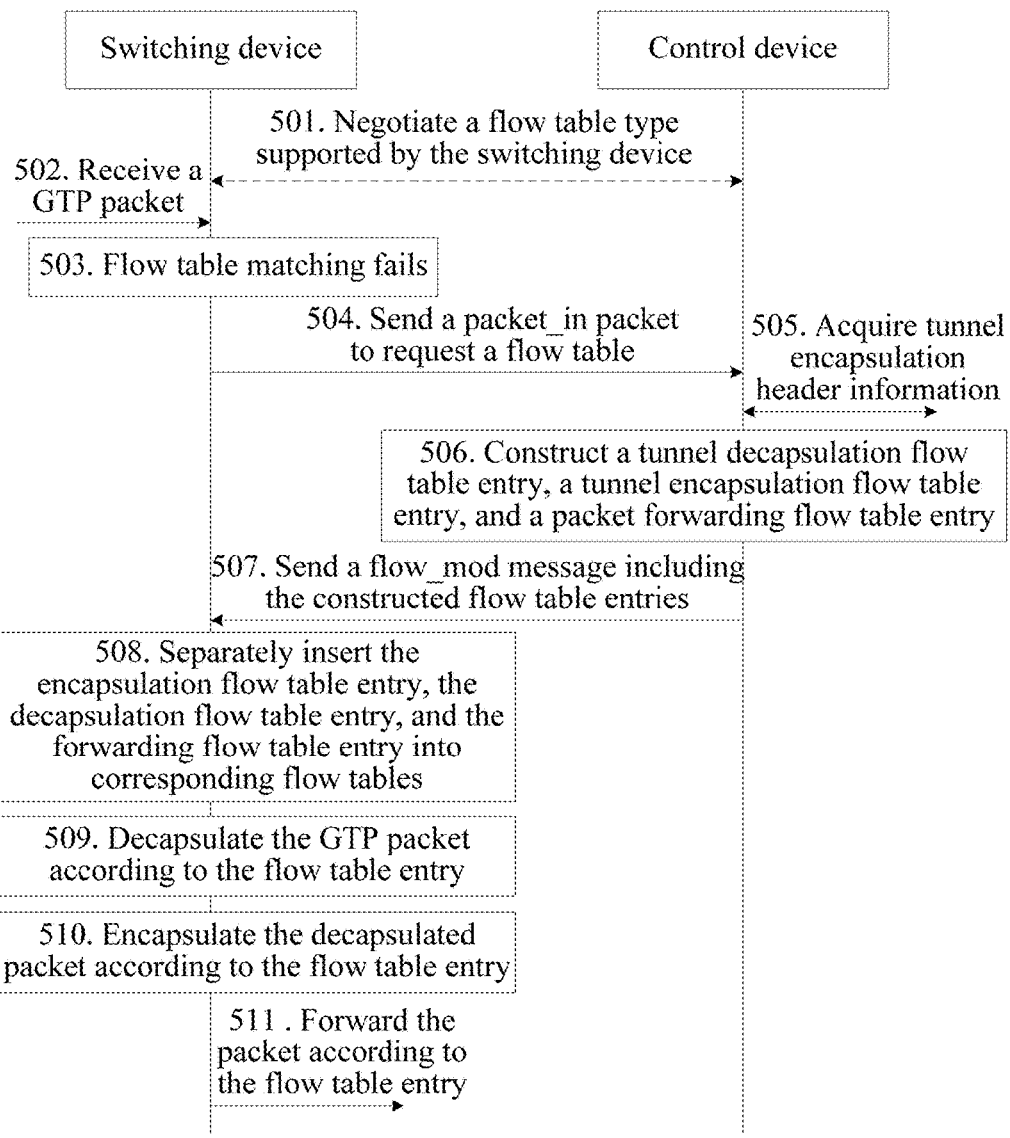
FIG. 5 is a flowchart of another embodiment of a packet tunneling method according to the present invention.

Referring to FIG. 5, FIG. 5 is a flowchart of another embodiment of a packet tunneling method according to the present invention. This embodiment shows a procedure in which a packet is encapsulated again and forwarded after being decapsulated.

Step 501: A switching device negotiates a flow table type supported by the control device with a control device.

In this step, the control device may send a table feature request (table entry type request) message to the switching device, to request a flow table type on the switching device; after receiving the table feature request message, the switching device may generate a table feature reply (table entry type reply) message including the flow table type supported by the switching device, and send the table feature reply message to the control device, so as to complete a procedure of negotiating a flow table type between the control device and the switching device.

Step 502: The switching device receives a GTP packet.

In this embodiment, it is assumed that the GTP packet received by the switching device is an initial packet of a certain data flow.

Step 503: The switching device does not find a flow table matching the GTP packet.

After receiving the GTP packet, the switching device matches the GTP packet with a flow table in the switching device. Because the GTP packet is an initial packet of the data flow, a flow table entry matching the GTP packet cannot be found in an existing flow table. As a result, the switching device fails to find a flow table for the GTP packet.

Step 504: The switching device reports, to the control device, a packet_in packet obtained after the GTP packet is encapsulated.

The switching device encapsulates the GTP packet into the packet_in packet by using the OpenFlow protocol, where the packet_in packet may includes a match field used as a feature of the packet, in addition to the original GTP packet. The switching device reports the packet_in packet to a controller.

The match field may be a field of the flow table searched for by a user in the foregoing step 503; and the match field may refer to at least one field in 12 fields defined in the OpenFlow1.0 protocol, or may refer to at least one field in 40 fields in the OpenFlow1.3 protocol. Further, in this embodiment, the match field may further include a TEID.

Step 505: The control device determines to perform tunnel encapsulation on the GTP packet again after decapsulating the GTP packet, and acquires header information for tunnel encapsulation.

In this embodiment, a correspondence between a match field and an execution action may be preset in the control device. After receiving the packet_in packet, the control device parses the packet to obtain a match field included in the packet, and matches the match field with the foregoing correspondence, to obtain an execution action corresponding to the match field. The match field may specifically be a source IP address, a source MAC address, or the like of the packet. In this embodiment, it is assumed that an execution action that is corresponding to the match field and is obtained by the control device according to a correspondence is encapsulating the packet again after decapsulating the packet.

In this embodiment, when determining to encapsulate the GTP packet again after decapsulating the GTP packet, the control device may obtain header information for tunnel encapsulation from a controller of a core network, where the header information includes an external IP address, a UDP port number, and a TEID that are used for tunnel encapsulation.

Step 506: The control device constructs a decapsulation flow table entry, an encapsulation flow table entry, and a forwarding flow table entry for the GTP packet.

When constructing the decapsulation flow table entry, the encapsulation flow table entry, and the forwarding flow table entry for the GTP packet, the control device may use construction manners described in the existing OpenFlow1.0 protocol and OpenFlow1.3 protocol. The constructed flow table entries mainly include a match field, counters, and an action set (Instructions), and may further include a priority of the flow table entry in a corresponding flow table. A match field in the match field of the decapsulation flow table entry may be a source MAC address, a destination MAC address, a source IP address, a destination IP address, a source TCP/UDP port number, a destination TCP/UDP port number, or a TEID; after matching is completed, an action instruction in the action set may be discarding a packet, jumping to a forwarding flow table, or jumping to a tunnel encapsulation flow table. A match field in the match domain of the encapsulation flow table entry may be a source MAC address, a destination MAC address, a source IP address, a destination IP address, a source TCP/UDP port number, or a destination TCP/UDP port number; after matching is completed, an action instruction in the action set may be discarding a packet, jumping to a forwarding flow table, or jumping to a tunnel decapsulation flow table. The forwarding flow table entry may be a flow table entry in the Route Table shown in the foregoing FIG. 1B.

Step 507: The control device encapsulates the constructed flow table entries into a flow_mod message and then sends the flow_mod message to the switching device.

The control device encapsulates the decapsulation flow table entry, the encapsulation flow table entry, and the forwarding flow table entry into the flow_mod message by using the OpenFlow protocol, where the flow_mod message includes a flow table type, a flow table entry corresponding to each flow table type, and header information for tunnel encapsulation.

Step 508: The switching device respectively inserts the decapsulation flow table entry, the encapsulation flow table entry, and the forwarding flow table entry that are in the flow_mod message into a corresponding decapsulation flow table, encapsulation flow table and forwarding flow table according to types.

After receiving the flow_mod message, the switching device parses the flow_mod message, to obtain the decapsulation flow table entry, the encapsulation flow table entry, and the forwarding flow table entry that are in the flow_mod message, and may insert the decapsulation flow table entry into a corresponding location of the decapsulation flow table according to a priority of the decapsulation flow table entry, insert the encapsulation flow table entry into a corresponding location of the encapsulation flow table according to a priority of the encapsulation flow table entry, and insert the forwarding flow table entry into a corresponding location of the forwarding flow table according to a priority of the forwarding flow table entry.

Step 509: After matching the GTP packet with the decapsulation flow table, the switching device performs tunnel decapsulation on the GTP packet.

In the foregoing step 503, when the switching device does not find the flow table entry matching the GTP packet, the switching device may first store the GTP packet in a buffer. In this step, the switching device extracts the GTP packet from the buffer, then matches the GTP packet with a flow table, and performs tunnel decapsulation on the GTP packet according to a matched flow table entry. During tunnel decapsulation, the switching device removes an external MAC address, an IP address, a UDP port number, and a TEID of the packet.

Step 510: After matching the decapsulated GTP packet with the encapsulation flow table, the switching device encapsulates the decapsulated GTP packet again.

After obtaining the decapsulated GTP packet, the switching device matches the GTP packet with the flow table, and performs tunnel encapsulation on the GTP packet according to the matched flow table entry. During tunnel encapsulation, the switching device adds tunnel header information and an external MAC address to the packet, where the tunnel header information includes an external IP address, a UDP port number, and a TEID, and the external MAC address may be obtained from an ARP flow table or the forwarding flow table.

Step 511: The switching device matches the tunnel-encapsulated packet with the forwarding flow table, and forwards the tunnel-encapsulated packet according to the forwarding flow table entry.

After encapsulating the decapsulated GTP packet again, the switching device further performs matching of the forwarding flow table, to obtain a corresponding forwarding flow table entry, and forwards the tunnel-encapsulated packet according to the forwarding flow table entry. Compared with the prior art, in this embodiment, the TEID may further be added as the match field during matching of the forwarding flow table entry.

It can be seen from the foregoing embodiment that, in this embodiment, because a switching device supports a tunnel flow table, when a packet is transmitted in a mobile packet network by using the OpenFlow protocol, tunnel encapsulation or decapsulation can be performed on the packet by using a tunnel flow table entry delivered by a control device, thereby enhancing a packet processing capability in the mobile packet network.

Corresponding to the embodiments of the packet tunneling method according to the present invention, the present invention further provides embodiments of a switching device and a control device.

Figure 6:
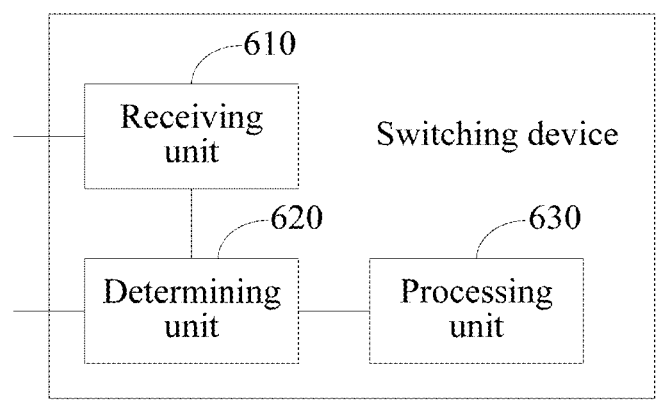
FIG. 6 is a block diagram of an embodiment of a switching device according to the present invention.

Referring to FIG. 6, FIG. 6 is a block diagram of an embodiment of a switching device according to the present invention.

The switching device includes: a receiving unit 610, a determining unit 620, and a processing unit 630.

The receiving unit 610 is configured to receive a tunnel flow table entry delivered by a control device, where the tunnel flow table entry is used to determine a to-be-tunneled packet and indicate a tunneling operation to be performed on the to-be-tunneled packet, and the control device is configured to control forwarding of a packet received by the switching device.

The determining unit 620 is configured to determine, according to the tunnel flow table entry received by the receiving unit, whether a received first packet is the to-be-tunneled packet.

The processing unit 630 is configured to: when the determining unit determines that the first packet is the to-be-tunneled packet, tunnel the first packet according to the tunnel flow table entry.

The processing unit 630 may be specifically configured to: when the tunnel flow table entry is a tunnel encapsulation flow table entry, add, to the first packet according to the tunnel encapsulation flow table entry, tunnel header information and a Media Access Control layer MAC address that is used to forward the tunnel-encapsulated first packet, where the tunnel header information includes an external Internet Protocol IP address, a User Datagram Protocol UDP port number, and a tunnel endpoint identifier TEID of the first packet; when the tunnel flow table entry is a tunnel decapsulation flow table entry, remove the tunnel header information of the first packet according to the tunnel decapsulation flow table entry, and then add a MAC address used to forward the tunnel-decapsulated first packet, where the tunnel header information includes an external MAC address, the external IP address, the UDP port number, and the TEID of the first packet; and when the tunnel flow table entry is the tunnel decapsulation flow table entry and the tunnel encapsulation flow table entry, remove first tunnel header information of the first packet according to the tunnel decapsulation flow table entry, where the first tunnel header information includes a first external MAC address, a first external IP address, a first UDP port number, and a first TEID of the first packet, and add, to the decapsulated first packet according to the tunnel encapsulation flow table entry, second tunnel header information and the MAC address used to forward the tunnel-encapsulated first packet, where the second tunnel header information includes a second external IP address, a second UDP port number, and a second TEID.

Figure 7:
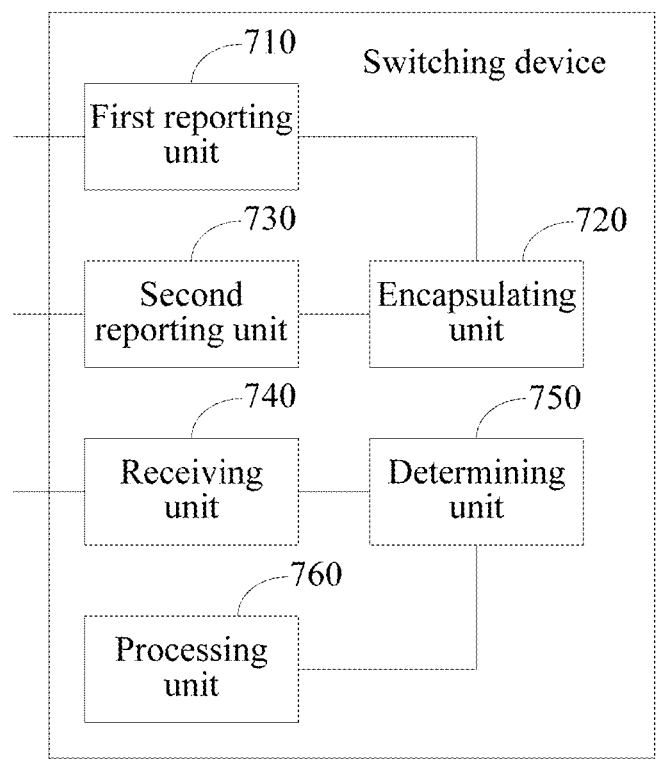
FIG. 7 is a block diagram of another embodiment of a switching device according to the present invention.

Referring to FIG. 7, FIG. 7 is a block diagram of another embodiment of a switching device according to the present invention.

The switching device includes: a first reporting unit 710, an encapsulating unit 720, a second reporting unit 730, a receiving unit 740, a determining unit 750, and a processing unit 760.

The first reporting unit 710 is configured to report a flow table type, which is supported by the switching device, of a flow table to a control device, where the flow table type includes a tunnel flow table.

The encapsulating unit 720 is configured to: when the switching device receives a second packet of a data flow, encapsulate the second packet into an information reporting message by using the OpenFlow OpenFlow protocol, where the information reporting message further includes a match field of the second packet, and the match field is used to enable the control device to determine to tunnel the second packet, where the first packet is a packet belonging to the data flow.

The second reporting unit 730 is configured to report the information reporting message encapsulated by the encapsulating unit to the control device.

The receiving unit 740 is configured to receive a flow table entry update message delivered by the control device, where the flow table entry update message is a message that is generated after the control device determines, according to the match field, to tunnel the second packet and then encapsulates, by using the OpenFlow protocol, the tunnel flow table entry generated for the second packet.

The determining unit 750 is configured to determine, according to the tunnel flow table entry encapsulated in the flow table entry update message received by the receiving unit, whether a received first packet is the to-be-tunneled packet.

The processing unit 760 is configured to: when the determining unit determines that the first packet is the to-be-tunneled packet, tunnel the first packet according to the tunnel flow table entry.

The processing unit 760 may be specifically configured to: when the tunnel flow table entry is a tunnel encapsulation flow table entry, add, to the first packet according to the tunnel encapsulation flow table entry, tunnel header information and a Media Access Control layer MAC address that is used to forward the tunnel-encapsulated first packet, where the tunnel header information includes an external Internet Protocol IP address, a User Datagram Protocol UDP port number, and a tunnel endpoint identifier TEID of the first packet; when the tunnel flow table entry is a tunnel decapsulation flow table entry, remove the tunnel header information of the first packet according to the tunnel decapsulation flow table entry, and then add a MAC address used to forward the tunnel-decapsulated first packet, where the tunnel header information includes an external MAC address, the external IP address, the UDP port number, and the TEID of the first packet; and when the tunnel flow table entry is the tunnel decapsulation flow table entry and the tunnel encapsulation flow table entry, remove first tunnel header information of the first packet according to the tunnel decapsulation flow table entry, where the first tunnel header information includes a first external MAC address, a first external IP address, a first UDP port number, and a first TEID of the first packet, and add, to the decapsulated first packet according to the tunnel encapsulation flow table entry, second tunnel header information and the MAC address used to forward the tunnel-encapsulated first packet, where the second tunnel header information includes a second external IP address, a second UDP port number, and a second TEID.

Figure 8:
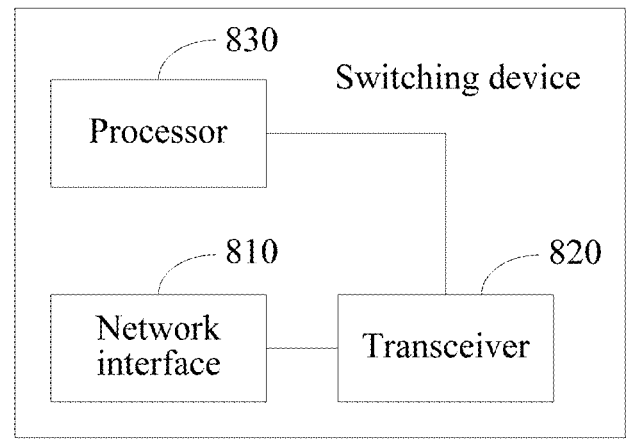
FIG. 8 is a block diagram of another embodiment of a switching device according to the present invention.

Referring to FIG. 8, FIG. 8 is a block diagram of another embodiment of a switching device according to the present invention.

The switching device includes: a network interface 810, a transceiver 820, and a processor 830.

The network interface 810 is configured to establish a network connection to a control device.

The transceiver 820 is configured to receive a tunnel flow table entry delivered by the control device, where the tunnel flow table entry is used to determine a to-be-tunneled packet and indicate a tunneling operation to be performed on the to-be-tunneled packet, and the control device is configured to control forwarding of a packet received by the switching device.

The processor 830 is configured to determine, according to the tunnel flow table entry, whether a received first packet is the to-be-tunneled packet, and when the first packet is the to-be-tunneled packet, tunnel the first packet according to the tunnel flow table entry.

In an optional implementation manner, the transceiver 820 is further configured to report a flow table type, which is supported by the switching device, of a flow table to the control device, where the flow table type includes a tunnel flow table; and correspondingly, the transceiver 830 may be specifically configured to receive the tunnel flow table entry that is delivered by the control device to the switching device according to the flow table type.

In another optional implementation manner, the processor 830 may be further configured to: when the transceiver receives a second packet of a data flow, encapsulate the second packet into an information reporting message by using the OpenFlow OpenFlow protocol, where the information reporting message further includes a match field of the second packet, and the match field is used to enable the control device to determine to tunnel the second packet, where the first packet is a packet belonging to the data flow;

the transceiver 820 may be further configured to report the information reporting message to the control device; and the transceiver 820 may be specifically configured to receive a flow table entry update message delivered by the control device, where the flow table entry update message is a message that is generated after the control device determines, according to the match field, to tunnel the second packet and then encapsulates, by using the OpenFlow protocol, the tunnel flow table entry generated for the second packet.

In another optional implementation manner, the processor 830 may be specifically configured to: when the tunnel flow table entry is a tunnel encapsulation flow table entry, add, to the first packet according to the tunnel encapsulation flow table entry, tunnel header information and a Media Access Control layer MAC address that is used to forward the tunnel-encapsulated first packet, where the tunnel header information includes an external Internet Protocol IP address, a User Datagram Protocol UDP port number, and a tunnel endpoint identifier TEID of the first packet; when the tunnel flow table entry is a tunnel decapsulation flow table entry, remove the tunnel header information of the first packet according to the tunnel decapsulation flow table entry, and then add a MAC address used to forward the tunnel-decapsulated first packet, where the tunnel header information includes an external MAC address, the external IP address, the UDP port number, and the TEID of the first packet; and when the tunnel flow table entry is the tunnel decapsulation flow table entry and the tunnel encapsulation flow table entry, remove first tunnel header information of the first packet according to the tunnel decapsulation flow table entry, where the first tunnel header information includes a first external MAC address, a first external IP address, a first UDP port number, and a first TEID of the first packet, and add, to the decapsulated first packet according to the tunnel encapsulation flow table entry, second tunnel header information and the MAC address used to forward the tunnel-encapsulated first packet, where the second tunnel header information includes a second external IP address, a second UDP port number, and a second TEID.

Figure 9:
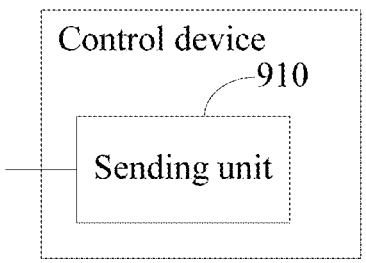
FIG. 9 is a block diagram of an embodiment of a control device according to the present invention.

Referring to FIG. 9, FIG. 9 is a block diagram of an embodiment of a control device according to the present invention.

The control device includes a sending unit 910.

The sending unit 910 is configured to deliver a tunnel flow table entry to a switching device, where the tunnel flow table entry is used to determine a to-be-tunneled packet and indicate a tunneling operation to be performed on the to-be-tunneled packet, and the switching device is configured to determine, according to the tunnel flow table entry, whether a received first packet is the to-be-tunneled packet, and when the first packet is the to-be-tunneled packet, tunnel the first packet according to the tunnel flow table entry.

Figure 10:
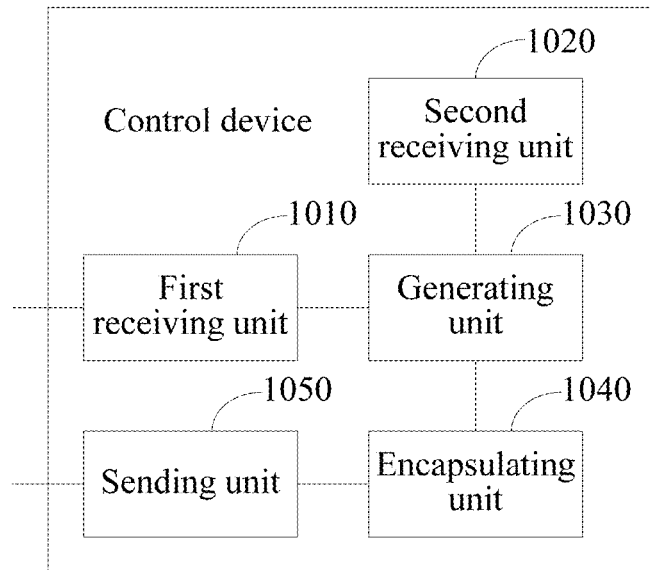
FIG. 10 is a block diagram of another embodiment of a control device according to the present invention.

Referring to FIG. 10, FIG. 10 is a block diagram of another embodiment of a control device according to the present invention.

The control device includes: a first receiving unit 1010, a second receiving unit 1020, a generating unit 1030, an encapsulating unit 1040, and a sending unit 1050.

The first receiving unit 1010 is configured to receive a flow table type, which is reported by a switching device and supported by the switching device, of a flow table, where the flow table type includes a tunnel flow table.

The second receiving unit 1020 is configured to receive an information reporting message reported by the switching device, where the information reporting message is a message generated by encapsulating a second packet by using the OpenFlow protocol when the switching device receives the second packet of a data flow, the information reporting message further includes a match field of the initial packet, and the match field is used to enable the control device to determine to tunnel the second packet, where the first packet is a packet belonging to the data flow.

The generating unit 1030 is configured to: after the control device determines, according to the match field in the information reporting message received by the second receiving unit, to tunnel the second packet, generate a tunnel flow table entry for the second packet.

The encapsulating unit 1040 is configured to encapsulate, by using the OpenFlow protocol, the tunnel flow table entry generated by the generating unit into a flow table entry update message.

The sending unit 1050 is configured to deliver the flow table entry update message encapsulated by the encapsulating unit to the switching device.

The encapsulating unit 1040 may be further configured to: when the tunnel flow table entry includes a tunnel encapsulation flow table entry, add tunnel header information to the encapsulated flow table entry update message, where the tunnel header information includes an external IP address, a UDP port number, and a TEID which are used to perform tunnel encapsulation on a packet; and when the tunnel flow table entry includes a tunnel decapsulation flow table entry, add, to the encapsulated flow table entry update message, a MAC address used to forward a tunnel-decapsulated packet.

Figure 11:
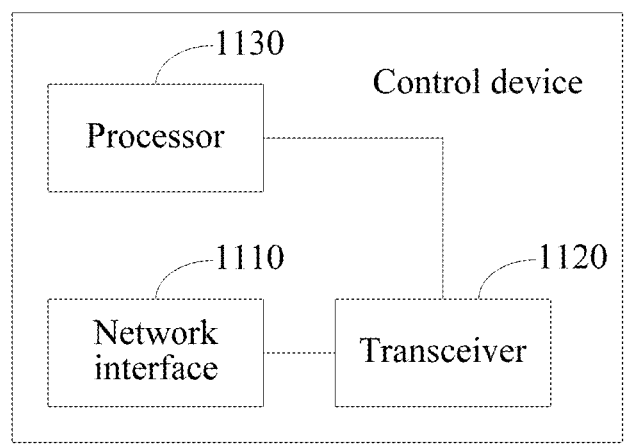
FIG. 11 is a block diagram of another embodiment of a control device according to the present invention.

Referring to FIG. 11, FIG. 11 is a block diagram of another embodiment of a control device according to the present invention.

The control device includes: a network interface 1110, a transceiver 1120, and a processor 1130.

The network interface 1110 is configured to establish a network connection to a switching device.

The transceiver 1120 is configured to deliver a tunnel flow table entry to the switching device, where the tunnel flow table entry is used to determine a to-be-tunneled packet and indicate a tunneling operation to be performed on the to-be-tunneled packet, and the switching device is configured to determine, according to the tunnel flow table entry, whether a received first packet is the to-be-tunneled packet, and when the first packet is the to-be-tunneled packet, tunnel the first packet according to the tunnel flow table entry.

In an optional implementation manner, the transceiver 1120 may be further configured to: before delivering the tunnel flow table entry to the switching device, receive a flow table type, which is reported by the switching device and supported by the switching device, of a flow table, where the flow table type includes a tunnel flow table; and the transceiver 1120 may be specifically configured to deliver the tunnel flow table entry to the switching device according to the flow table type.

In another optional implementation manner, the transceiver 1120 may be further configured to: before delivering the tunnel flow table entry to the switching device, receive an information reporting message reported by the switching device, where the information reporting message is a message generated by encapsulating a second packet by using the OpenFlow protocol when the switching device receives the second packet of a data flow, the information reporting message further includes a match field of the initial packet, and the match field is used to enable the control device to determine to tunnel the second packet, where the first packet is a packet belonging to the data flow;

the processor 1130 may be further configured to: after the control device determines, according to the match field, to tunnel the second packet, generate a tunnel flow table entry for the second packet, and encapsulate the tunnel flow table entry into a flow table entry update message by using the OpenFlow protocol; and the transceiver 1120 may be specifically configured to deliver the flow table entry update message to the switching device.

In another optional implementation manner, the processor 1130 may be further configured to: when the tunnel flow table entry includes a tunnel encapsulation flow table entry, add tunnel header information to the encapsulated flow table entry update message, where the tunnel header information includes an external IP address, a UDP port number, and a TEID which are used to perform tunnel encapsulation on a packet; and when the tunnel flow table entry includes a tunnel decapsulation flow table entry, add, to the encapsulated flow table entry update message, a MAC address used to forward a tunnel-decapsulated packet.

It can be seen from the foregoing embodiment that, a control device delivers a tunnel flow table entry to a switching device, and the switching device determines, according to the tunnel flow table entry, whether a received first packet is a to-be-tunneled packet, and when the first packet is the to-be-tunneled packet, tunnels the first packet according to the tunnel flow table entry. In this embodiment of the present invention, because the switching device supports a tunnel flow table, when a packet is transmitted in a mobile packet network by using the OpenFlow protocol, tunnel encapsulation or decapsulation can be performed on the packet by using the tunnel flow table entry delivered by the control device, thereby enhancing a packet processing capability in the mobile packet network.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A packet tunneling method, comprising:
   receiving, by a switching device, a tunnel flow table entry delivered by a control device, wherein the tunnel flow table entry is used to determine a to-be-tunneled packet and indicate a tunneling operation to be performed on the to-be-tunneled packet, and the control device is configured to control forwarding of a first packet received by the switching device;
   determining, by the switching device according to the tunnel flow table entry, whether the received first packet is the to-be-tunneled packet; and
   when the first packet is the to-be-tunneled packet, tunneling, by the switching device, the first packet according to the tunnel flow table entry,
   wherein before the receiving, by a switching device, a tunnel flow table entry delivered by a control device, the method further comprises:
   when the switching device receives a second packet of a data flow, encapsulating the second packet into an information reporting message by using the OpenFlow protocol, wherein the information reporting message further comprises a match field of the second packet, and the match field is used to enable the control device to determine to tunnel the second packet, wherein the first packet is a packet belonging to the data flow; and
   reporting, by the switching device, the information reporting message to the control device; and
   the receiving, by a switching device, a tunnel flow table entry delivered by a control device comprises: receiving, by the switching device, a flow table entry update message delivered by the control device, wherein the flow table entry update message is a message that is generated after the control device determines, according to the match field, to tunnel the second packet and then encapsulates, by using the OpenFlow protocol, the tunnel flow table entry generated for the second packet.

2. The method according to claim 1, wherein before the receiving, by a switching device, a tunnel flow table entry delivered by a control device, the method further comprises:
   reporting, by the switching device, a flow table type, which is supported by the switching device, to the control device, wherein the flow table type comprises a tunnel flow table; and
   the receiving, by a switching device, a tunnel flow table entry delivered by a control device comprises: receiving, by the switching device, the tunnel flow table entry that is delivered by the control device to the switching device according to the flow table type.

3. The method according to claim 1, wherein when the tunnel flow table entry is a tunnel encapsulation flow table entry, the tunneling, by the switching device, the first packet according to the tunnel flow table entry comprises:
adding, by the switching device to the first packet according to the tunnel encapsulation flow table entry, tunnel header information and a Media Access Control (MAC) address that is used to forward the tunnel-encapsulated first packet, wherein the tunnel header information comprises an external Internet Protocol (IP) address, a User Datagram Protocol (UDP) port number, and a tunnel endpoint identifier (TEID) of the first packet.

4. The method according to claim 1, wherein when the tunnel flow table entry is a tunnel decapsulation flow table entry, the tunneling, by the switching device, the first packet according to the tunnel flow table entry comprises:
after the switching device removes tunnel header information of the first packet according to the tunnel decapsulation flow table entry, adding a MAC address that is used to forward the tunnel-decapsulated first packet, wherein the tunnel header information comprises an external MAC address, an external IP address, a UDP port number, and a TEID of the first packet.

5. The method according to claim 1, wherein when the tunnel flow table entry is a tunnel decapsulation flow table entry and a tunnel encapsulation flow table entry, the tunneling, by the switching device, the first packet according to the tunnel flow table entry comprises:
removing, by the switching device, first tunnel header information of the first packet according to the tunnel decapsulation flow table entry, wherein the first tunnel header information comprises a first external MAC address, a first external IP address, a first UDP port number, and a first TEID of the first packet; and
adding, by the switching device to the decapsulated first packet according to the tunnel encapsulation flow table entry, second tunnel header information and a MAC address that is used to forward the tunnel-encapsulated first packet, wherein the second tunnel header information comprises a second external IP address, a second UDP port number, and a second TEID.

6. The method according to claim 1, wherein the switching device is a first serving gateway and the first packet is transmitted from the first serving gateway to a second serving gateway by the tunneling.

7. A switching device, comprising:
a receiver, configured to receive a tunnel flow table entry delivered by a control device, wherein the tunnel flow table entry is used to determine a to-be-tunneled packet and indicate a tunneling operation to be performed on the to-be-tunneled packet, and the control device is configured to control forwarding of a first packet received by the switching device;
a processor, configured to determine, according to the received tunnel flow table entry, whether the received first packet is the to-be-tunneled packet; and when it is determined that the first packet is the to-be-tunneled packet, tunnel the first packet according to the tunnel flow table entry,
wherein the processor is further configured to: when the switching device receives a second packet of a data flow, encapsulate the second packet into an information reporting message by using the OpenFlow protocol, wherein the information reporting message further comprises a match field of the second packet, and the match field is used to enable the control device to determine to tunnel the second packet, wherein the first packet is a packet belonging to the data flow; and
wherein the switching device further comprises a transmitter configured to report the encapsulated information reporting message to the control device; wherein
the receiver configured to receive a flow table entry update message delivered by the control device, wherein the flow table entry update message is a message that is generated after the control device determines, according to the match field, to tunnel the second packet and then encapsulates, by using the OpenFlow protocol, the tunnel flow table entry generated for the second packet.

8. The switching device according to claim 7, further comprising:
a transmitter, configured to: before the tunnel flow table entry is received, report a flow table type, which is supported by the switching device, to the control device, wherein the flow table type comprises a tunnel flow table; wherein
the receiver is configured to receive the tunnel flow table entry that is delivered by the control device to the switching device according to the flow table type.

9. The switching device according to claim 7, wherein the processor is configured to: when the tunnel flow table entry is a tunnel encapsulation flow table entry, add, to the first packet according to the tunnel encapsulation flow table entry, tunnel header information and a Media Access Control (MAC) address that is used to forward the tunnel-encapsulated first packet, wherein the tunnel header information comprises an external Internet Protocol (IP) address, a User Datagram Protocol (UDP) port number, and a tunnel endpoint identifier (TEID) of the first packet.

10. The switching device according to claim 7, wherein the processor is configured to: when the tunnel flow table entry is a tunnel decapsulation flow table entry, remove tunnel header information of the first packet according to the tunnel decapsulation flow table entry, and then add a MAC address used to forward the tunnel-decapsulated first packet, wherein the tunnel header information comprises an external MAC address, an external IP address, a UDP port number, and a TEID of the first packet.

11. The switching device according to claim 7, wherein the processor is configured to: when the tunnel flow table entry is a tunnel decapsulation flow table entry and a tunnel encapsulation flow table entry, remove first tunnel header information of the first packet according to the tunnel decapsulation flow table entry, wherein the first tunnel header information comprises a first external MAC address, a first external IP address, a first UDP port number, and a first TEID of the first packet; and add, to the decapsulated first packet according to the tunnel encapsulation flow table entry, second tunnel header information and a MAC address that is used to forward the tunnel-encapsulated first packet, wherein the second tunnel header information comprises a second external IP address, a second UDP port number, and a second TEID.

12. The method according to claim 7, wherein the switching device is a first serving gateway and the first packet is transmitted from the first serving gateway to a second serving gateway by the tunneling.

13. A control device, wherein the control device comprises:
- a transmitter, configured to deliver a tunnel flow table entry to a switching device, wherein the tunnel flow table entry is used to determine a to-be-tunneled packet and indicate a tunneling operation to be performed on the to-be-tunneled packet, and the switching device is configured to determine, according to the tunnel flow table entry, whether the received first packet is the to-be-tunneled packet, and when the first packet is the to-be-tunneled packet, tunnel the first packet according to the tunnel flow table entry, wherein the control device further comprises:
- a receiver, configured to: before the tunnel flow table entry is delivered to the switching device, receive an information reporting message reported by the switching device, wherein the information reporting message is a message generated by encapsulating a second packet by using the OpenFlow protocol when the switching device receives the second packet of a data flow, the information reporting message further comprises a match field of the initial packet, and the match field is used to enable the control device to determine to tunnel the second packet, wherein the first packet is a packet belonging to the data flow;
- a processor, configured to: after the control device determines, according to the match field in the received information reporting message, to tunnel the second packet, generate the tunnel flow table entry for the second packet; and encapsulate, by using the OpenFlow protocol, the generated tunnel flow table entry into a flow table entry update message; wherein the transmitter is configured to deliver the encapsulated flow table entry update message to the switching device.

14. The control device according to claim 13, wherein the control device further comprises:
- a receiver, configured to: before the tunnel flow table entry is delivered to the switching device, receive a flow table type, which is reported by the switching device and supported by the switching device, wherein the flow table type comprises a tunnel flow table; wherein the transmitter is configured to deliver the tunnel flow table entry to the switching device according to the received flow table type.

15. The control device according to claim 13, wherein
the processor is further configured to: when the tunnel flow table entry comprises a tunnel encapsulation flow table entry, add tunnel header information to the encapsulated flow table entry update message, wherein the tunnel header information comprises an external IP address, a UDP port number, and a TEID which are used to perform tunnel encapsulation on a packet; and when the tunnel flow table entry comprises a tunnel decapsulation flow table entry, add, to the encapsulated flow table entry update message, a MAC address used to forward a tunnel-decapsulated packet.

16. The method according to claim 13, wherein the switching device is a first serving gateway and the first packet is transmitted from the first serving gateway to a second serving gateway by the tunneling.

* * * * *

UNITED STATES PATENT AND TRADEMARK OFFICE
CERTIFICATE OF CORRECTION

PATENT NO.         : 10,237,089 B2
APPLICATION NO.    : 15/217423
DATED              : March 19, 2019
INVENTOR(S)        : Pengcheng Tang et al.

Page 1 of 1

It is certified that error appears in the above-identified patent and that said Letters Patent is hereby corrected as shown below:

On the Title Page

Item (72), In the Inventor's Residence, after "Pengcheng Tang," delete "Shenzhen" and insert -- Shanghai --, therefor.

Signed and Sealed this
Fourth Day of February, 2020

Andrei Iancu
*Director of the United States Patent and Trademark Office*